(12) United States Patent
Zuniga

(10) Patent No.: US 7,820,225 B2
(45) Date of Patent: Oct. 26, 2010

(54) LOW SODIUM SALT COMPOSITIONS AND METHODS OF PREPARATION AND USES THEREOF

(75) Inventor: Juan Antonio Flores Zuniga, Guerrero Negro (MX)

(73) Assignee: Exportadora de Sal, S.A. de C.V., Guerrero Negro (MX)

( * ) Notice: Subject to any disclaimer, the term of this patent is extended or adjusted under 35 U.S.C. 154(b) by 0 days.

(21) Appl. No.: 12/073,541

(22) Filed: Mar. 6, 2008

(65) Prior Publication Data

US 2009/0041900 A1    Feb. 12, 2009

(51) Int. Cl.
*A23L 1/237* (2006.01)

(52) U.S. Cl. .................. 426/649; 426/665; 426/648; 426/471; 426/537; 426/495

(58) Field of Classification Search ................. None
See application file for complete search history.

(56) References Cited

U.S. PATENT DOCUMENTS

| | | | | |
|---|---|---|---|---|
| 3,726,965 | A | * | 4/1973 | Neitzel et al. ............... 423/551 |
| 3,967,930 | A | * | 7/1976 | Sadan ........................ 23/296 |
| 4,216,244 | A | | 8/1980 | Allen, Jr. et al. |
| 4,243,691 | A | * | 1/1981 | Mohlenkamp et al. ...... 426/649 |
| 4,306,880 | A | | 12/1981 | Garrett |
| 4,473,595 | A | * | 9/1984 | Rood et al. ................. 426/649 |
| 5,626,904 | A | * | 5/1997 | Frederiksen ............... 426/649 |
| 5,871,803 | A | * | 2/1999 | Bonorden et al. .......... 426/649 |
| 6,048,569 | A | | 4/2000 | Garcia et al. |
| 6,541,050 | B1 | | 4/2003 | Bonorden et al. |
| 7,014,832 | B2 | | 3/2006 | Vohra et al. |
| 7,621,968 | B1 | | 11/2009 | Kirchner et al. |
| 2008/0220127 | A1 | | 9/2008 | Zuniga |

FOREIGN PATENT DOCUMENTS

| | | | | |
|---|---|---|---|---|
| DE | | 3008171 A | * | 9/1981 |
| DE | | 244739 A | * | 4/1987 |
| SU | | 1296510 A | * | 3/1987 |
| WO | WO 8605954 A1 | | * | 10/1986 |
| WO | WO 9000522 A1 | | * | 1/1990 |
| WO | WO 03/035550 | | | 5/2003 |

OTHER PUBLICATIONS

Wiley-VCH Staff Wiley-Vch (COR), Ullmann's Agrochemicals, 2007, p. 454. http://books.google.com/books?id=cltuoO9zSjkC&dq=Ullmann's=Agrochemicals&printsec=3.*

Redacted Filing receipt for an application filed on Aug. 25, 2006, entitled "Low sodium sea salt and process for producing low sodium sea salt from seawater."

Bulletin of the National Research Council, No. 82, 1932, "Properties of Sea Water" pp. 63-203.

International Critical Tables, 1928, vol. IV, p. 282-284.

* cited by examiner

*Primary Examiner*—Jennifer C McNeil
*Assistant Examiner*—Hong Mehta
(74) *Attorney, Agent, or Firm*—Jones Day

(57) ABSTRACT

Low sodium salt compositions containing a blend of sodium chloride and one or more magnesium, sodium and potassium salts are provided. Also provided are methods for making and using the compositions. Further provided are food products containing the compositions.

14 Claims, 2 Drawing Sheets

LOW SODIUM SALT COMPOSITIONS AND METHODS OF PREPARATION AND USES THEREOF

1. PRIORITY CLAIM

Figure 1:
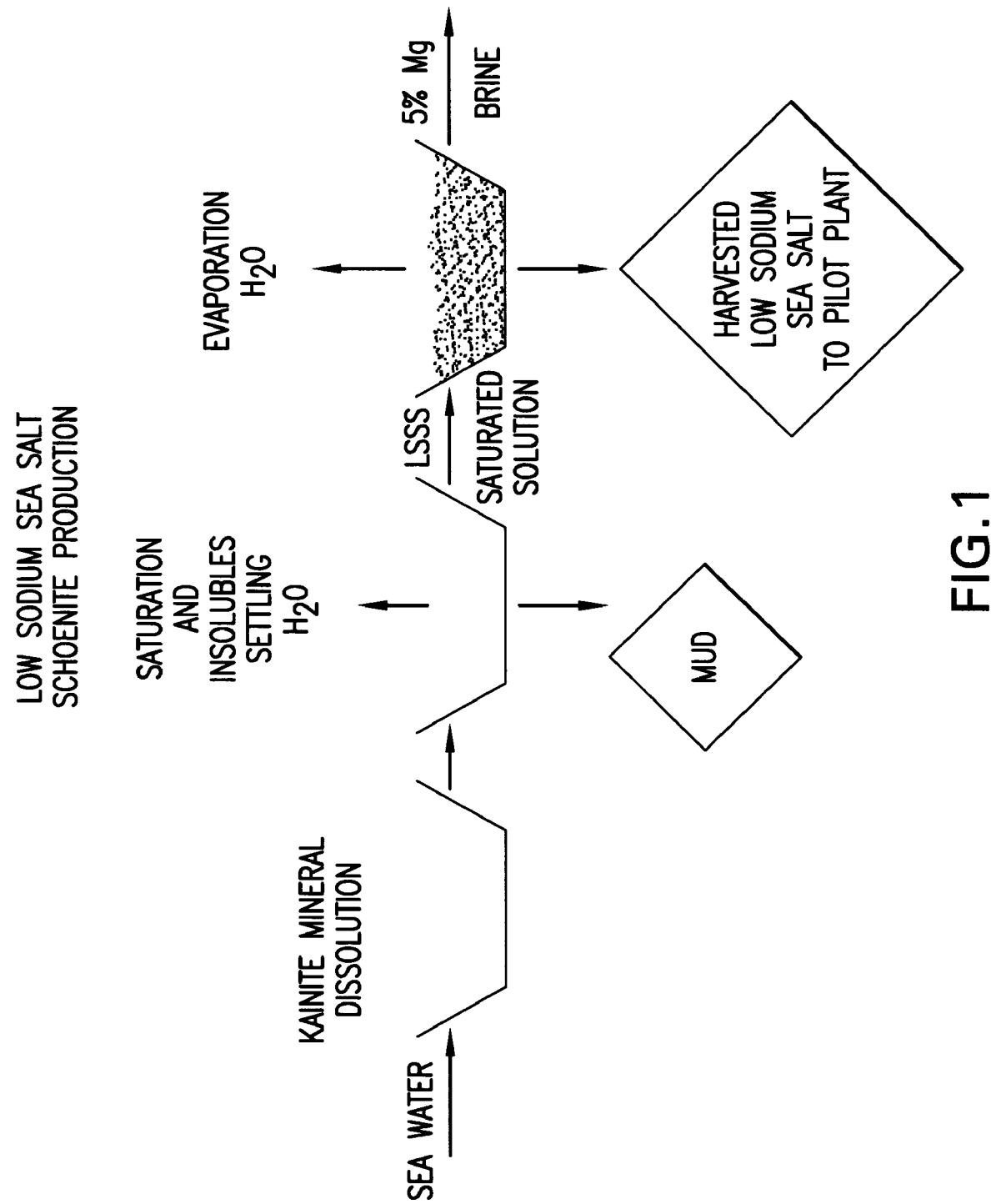

This application claims priority to U.S. application Ser. No. 11/715,706 filed Mar. 7, 2007 to Juan Antonio Flores Zuniga. The disclosure of the above referenced application is incorporated by reference in its entirety.

2. FIELD

Provided herein are salty testing low sodium salt compositions containing a blend of sodium chloride and one or more magnesium, sodium and potassium salts, including sulfate, chloride and double salts. Further provided are methods for preparing and using the compositions.

3. BACKGROUND

Common salt, i.e. sodium chloride, is the additive most frequently used in food and beverage preparation, both for household and food industry use. It is necessary to consume a certain amount of sodium ions and chloride ions to maintain the salt balance of the body, but the intake of sodium chloride is usually much larger than the minimum required.

The Food and Drug Administration recommends a daily, 500 mg minimal and 2,400 mg maximal, sodium intake. Notwithstanding this recommendation, the average American consumes more than 4,000 mg per day, three-fourths of which comes from processed foodstuffs and ingested nourishment. The American Public Health Association (APHA) has proposed to reduce sodium content in processed foodstuffs by 50%. The APHA estimates the change could cut the number of hypertension sufferers by 20 percent, eventually saving 150,000 lives a year.

A reduction of sodium intake is prescribed to patients with diseases that affect the cardiovascular system because many of these patients present altered renal capacities to excrete the sodium.

Cardiac ischemic disease constitutes the foremost cause of death in the Western world. Over 5 million people in the United States alone are annually diagnosed with the disease. A reduction in salt intake in patients with light cardiac insufficiency can substantially improve measures against symptoms, facilitate the activation of certain medication and, thus, ameliorate the quality of life of the patients.

As per the Department of Medicine, Division of Gastroenterology, University of Massachusetts Medical Center, gastric cancer is the second most common cause of cancer relating to mortality in the world. Detection of the disease commonly occurs at an advanced stage and the overall survival rate is poor. Sodium retains a positive correlation to the incidence of gastric cancer. One of the recurrent findings from the medical testings performed on patients with gastric cancer is that of elevated salt intake.

In accordance with the National Heart, Lung and Blood Institute (NHLBI), overweight individuals consume more calories and more sodium. Consequently, they retain more sodium than individuals who are not overweight. In addition, research conducted by the NHLBI suggests an increase of 89% in mortality risk amongst overweight adults, due to cerebral damage, for every additional 100 mmol of sodium ingested.

A diet consistent with high sodium intakes reduces the level of nitric oxide and, in turn, augments the risk of undergoing cardiac, vascular, renal and cerebral diseases.

A diet consistent with a low-sodium intake is beneficial to the hypertensive, elderly, obese, salt sensitive, pregnant women, children, Syndrome X patients—those afflicted by insulin resistance, hyperinsulinism, abnormal intolerance to glucose, arterial hypertension, hypertriglyceridemia, and low HDL-cholesterol—as well as the overall population.

Further, several studies suggest that dietary potassium may play a role in decreasing blood pressure. Potassium is also involved in nerve function and muscle control. Increasing potassium in the diet may protect against hypertension in people who are sensitive to high levels of sodium.

Athletes also may need more potassium to replace that lost from muscle during exercise and the smaller amount lost in sweat. Low potassium can cause muscle cramping and cardiovascular irregularities. Eating foods high in potassium can prevent these symptoms.

In order to control the intake of sodium chloride, it has been proposed to use various salt combinations, wherein sodium chloride has been partially replaced by other salts, especially potassium chloride. Replacement of sodium chloride by other chemical compounds usually results in a taste deterioration.

It is therefore desirable to provide low sodium salt that would reduce the sodium intake and increase the potassium intake while preserving the salty taste.

4. SUMMARY

Provided herein are salty tasting low sodium salt compositions. In certain embodiments, the compositions contain about 20-80% lower sodium than regular salt. The compositions provided herein contain a blend of sodium chloride and one or more magnesium, sodium and potassium salts. In one embodiment, the salts are sulfate salts. In another embodiment, the low sodium salt compositions include potassium chloride. In another embodiment, the low sodium salt compositions provided herein do not contain magnesium chloride. In one aspect, the compositions contain a blend of the component salts, including double salts.

In certain embodiments, the compositions are hydrated low sodium salt compositions that contain sodium chloride and predominantly hydrated double salt schoenite, $MgSO_4 \cdot K_2SO_4 \cdot 6H_2O$. In one aspect, the two salts are blended in the composition. In certain embodiments, the compositions do not contain magnesium chloride. In certain embodiments, the compositions do not contain potassium chloride. In one aspect, the amount of sodium chloride in the hydrated compositions is between about 5 to about 70% by weight of the total composition. In one aspect, the amount of sodium chloride in the hydrated compositions is between about 10 to about 80% by weight of the total composition. In one aspect, the amount of sodium chloride in the hydrated compositions is between about 10 to about 30% by weight of the total composition.

In other embodiments, the compositions provided herein are anhydrous low sodium salt compositions that contain sodium chloride and predominantly anhydrous double salt glaserite, $3K_2SO_4 \cdot Na_2SO_4$. In one aspect, the two salts are blended in the composition. In certain embodiments, the compositions do not contain any $MgSO_4$. In one aspect, the amount of sodium chloride in the anhydrous compositions is between about 25 to about 60% by weight of the total composition.

In certain embodiments, the composition provided herein is a blend of $NaCl$, $Na_2SO_4$ and $K_2SO_4$. In other embodiments, the composition provided herein is a blend of $NaCl$, $K_2SO_4$ and $MgSO_4$ salt.

In certain embodiments, the low sodium salt compositions provided herein contain all naturally occurring salts. In other embodiments, the low sodium salt compositions herein contain a combination of natural and manufactured components.

In certain embodiments, the compositions contain sodium chloride and predominantly anhydrous double salt langbeinite, $2MgSO_4.K_2SO_4$. In one aspect, the two salts are blended in the composition. In certain embodiments, the compositions do not contain magnesium chloride. In certain embodiments, the compositions contain a small amount of potassium chloride. In one aspect, the amount of sodium chloride in the hydrated compositions is between about 5 to about 70% by weight of the total composition. In one aspect, the amount of sodium chloride in the hydrated compositions is between about 10 to about 80% by weight of the total composition. In one aspect, the amount of sodium chloride in the hydrated compositions is between about 20 to about 55% by weight of the total composition.

Further provided are methods for preparing the compositions. In one aspect, the methods involve evaporation of sea water bittern and terminal lake bitterns to obtain a mixed salt containing kainite ($K_2SO_4.MgSO_4.MgCl_2.6H_2O$) and sodium chloride. In certain embodiments, magnesium chloride is leached out from the mixed salt with natural water, such as sea water to obtain a mixture of schoenite ($K_2SO_4.MgSO_4.6H_2O$) and sodium chloride. This mixture is further reacted with potassium chloride and natural water, such as sea water to remove $MgSO_4$ to obtain anhydrous glaserite ($3K_2SO_4.Na_2SO_4$) and sodium chloride.

In certain embodiments, a saturated solution of schoenite ($K_2SO_4.MgSO_4.6H_2O$) is heated at a temperature greater than about 75° C., in certain embodiments, from about 80 to 100° C. to obtain an anhydrous double salt langbeinite ($2MgSO_4.K_2SO_4$). In certain embodiments, a saturated solution of kainite ($MgSO.KC_{1-6}H_2O$) is heated at a temperature greater than about 75° C., in certain embodiments, from about 80 to 100° C. to obtain an anhydrous double salt langbeinite ($2MgSO_4.K_2SO_4$).

In certain embodiments, the anhydrous low sodium salt compositions provided herein are obtained by blending $K_2SO_4$, $Na_2SO_4$ and NaCl in a blend.

In certain embodiments, the anhydrous low sodium salt compositions provided herein are obtained by reacting $K_2SO_4$ and $Na_2SO_4$ to form glaserite double salt and blended with NaCl to obtain a blend of component salts.

The hydrated and anhydrous low sodium salt compositions provided herein can be used as salt substitutes in food products or as table salt in the salt shaker for tabletop use for sprinkling on prepared foods. In a further embodiment, a food product containing a low sodium salt is provided herein.

5. BRIEF DESCRIPTION OF THE DRAWINGS

FIG. 1 provides a flow diagram for in situ dissolution of Kainite mineral, $K_2SO_4.MgSO_4.MgCl_2.6H_2O$ with sea water. As seen in the flow diagram, sea water is introduced into the pond containing kainite, to bring about the dissolution. The solution is transferred to a settling pond to affect the removal of the mud and concentrate at the same time to obtain saturated solution. The saturated solution is then solar evaporated to precipitate schoenite, $MgSO_4.K_2SO_4.6H_2O$.

Figure 2:
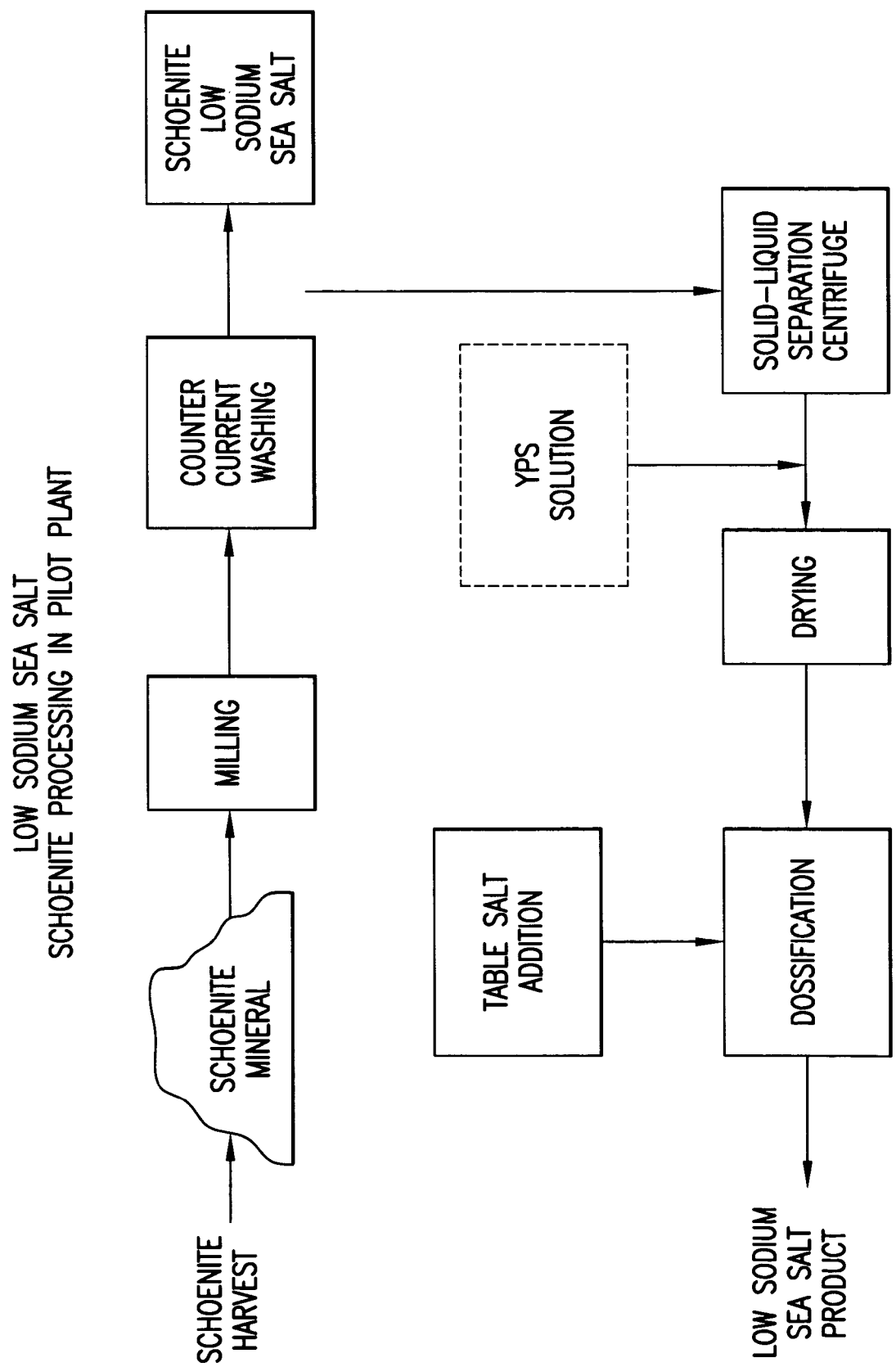

FIG. 2 provides a flow diagram for the production of low sodium sea salt from shoenite harvest in the process of FIG. 1 involving the steps of milling, counter current washing to obtain schoenite, solid liquid separation followed by the addition of anticaking agent YPS, drying and dossification with sodium chloride to provide low sodium sea salt.

6. DETAILED DESCRIPTION OF THE INVENTION

Provided herein are low sodium salt compositions containing a blend of sodium chloride and one or more other salts. In certain embodiment, the low sodium salt compositions herein provide the same salty taste as regular sodium chloride. Also provided are methods of making the compositions. Further provided are food products containing the compositions.

6.1 Definitions

Unless defined otherwise, all technical and scientific terms used herein have the same meaning as is commonly understood by one of ordinary skill in the art. All patents, applications, published applications and other publications are incorporated by reference in their entirety. In the event that there are a plurality of definitions for a term herein, those in this section prevail unless stated otherwise.

As used herein, natural water or water refers to water from any natural source, such as ocean, sea, brackish, lakes, such as salt lake or regular underground water.

As used herein, kainite refers to a hydrated salt predominantly containing $K_2SO_4.MgSO_4.MgCl_2.6H_2O$.

As used herein, schoenite refers to a hydrated salt predominantly containing $K_2SO_4.MgSO_4.6H_2O$.

As used herein, glaserite refers to an anhydrous salt predominantly containing $3K_2SO_4.Na_2SO_4$.

As used herein, langbeinite refers to an anhydrous salt predominantly containing $2MgSO_4.K_2SO_4$.

As used herein, harvesting refers to collecting salts from the pond.

As used herein, bitterns refer to concentrated magnesium water or brine remaining after sodium chloride has been precipitated.

As used herein, pond refers to a ground area confined by dykes from all sides to contain water, bitterns or salts obtained at various stages in the methods provided herein.

As used herein, predominantly refers to more than about 50%. In one embodiment, predominantly refers to at least 55%, 60%, 65%, 70%, 75%, 80%, 85%, 90%, 95% or 100%. For example, "schoenite predominantly containing $K_2SO_4.MgSO_4.6H_2O$" means the amount of $K_2SO_4.MgSO_4.6H_2O$ double salt in schoenite is more than about 50%, 55%, 60%, 65%, 70%, 75%, 80%, 85%, 90%, 95% or 100%. In another example, "glaserite predominantly containing $3K_2SO_4.Na_2SO_4$" means the amount of $3K_2SO_4.Na_2SO_4$ double salt in glaserite is more than about 50%, 55%, 60%, 65%, 70%, 75%, 80%, 85%, 90%, 95% or 100%. In yet another example, "langbeinite predominantly containing $2MgSO_4.K_2SO_4$" means the amount of $2MgSO_4.K_2SO_4$ double salt in langbeinite is more than about 50%, 55%, 60%, 65%, 70%, 75%, 80%, 85%, 90%, 95% or 100%.

As used herein, "dietary supplement" refers to any product that contains a "dietary ingredient" intended to supplement the diet. The "dietary ingredients" in these products may include: vitamins, minerals, herbs or other botanicals, amino acids, and substances such as enzymes, organ tissues, glandulars, and metabolites. Dietary supplements can also be extracts or concentrates.

As used herein, "blend" refers to a combination or mixture of salts such that the constituent salts in the combination or mixture are indistinguishable from one another upon non-magnified visual inspection.

As used herein, "regular salt" refers to the commercially available table salt that predominantly contains sodium chloride and may contain minor quantities of potassium iodide, potassium chloride and other salts.

6.2 Compositions

Provided herein are low sodium salt compositions. In one embodiment, the compositions provided herein contain a blend of sodium chloride and one or more sodium, magnesium and potassium salts or double salts. In certain embodiments, the compositions contain about 20-80% lower sodium than regular salt. In one embodiment, the compositions contain about 25%, 30%, 35%, 45%, 50%, 55%, 60%, 70%, 75% or 80% lower sodium than regular salt. In one embodiment, the compositions contain about 30%, 32%, 34%, 35%, 37%, 39%, 40%, 41%, 42%, 43%, 44%, 45%, 46%, 47%, 48%, 49% or 50% lower sodium than regular salt.

In certain embodiments, the compositions contain about 5-35% sodium by the total weight of the composition. In one embodiment, the compositions contain about 10, 12, 14, 16, 18, 20, 22 or 25% sodium by the total weight of the composition. In one embodiment, the compositions contain about 15, 18, 19, 20, 21, 22, 23, 24, 25, 26, 27, 28, 29 or 30% sodium by the total weight of the composition. In one embodiment, the compositions contain about 21%, 21.12%, 21.78%, 22%, 23% or 25% sodium by the total weight of the composition.

In certain embodiments the compositions are hydrated low sodium salt compositions that contain sodium chloride and a hydrated double salt schoenite, $MgSO_4.K_2SO_4.6H_2O$. The components are blended in the composition. In one embodiment, the compositions do not contain any $MgCl_2$.

In certain embodiments, the amount of sodium chloride in the hydrated low sodium salt composition is between about 10 to about 80% by weight of the total composition. In certain embodiments, the amount of sodium chloride in the hydrated low sodium salt composition is between about 70% to about 40% by weight of the total composition. In certain embodiments, the amount of sodium chloride in the hydrated low sodium salt composition is between about 10 to about 40% by weight of the total composition. In certain embodiments, the amount of sodium chloride in the hydrated low sodium salt composition is about 10, 12, 15, 17, 20, 22, 25, 27 or 30% by weight of the total composition. In certain embodiments, the amount of sodium chloride in the hydrated low sodium salt composition is about 15, 16, 17, 18, 19 or 20% by weight of the total composition. In one embodiment, the amount of sodium chloride in the hydrated low sodium salt composition is about 17% by weight of the total composition.

In certain embodiments, the amount of schoenite in the hydrated low sodium salt composition is between about 20 to about 90% by weight of the total composition. In certain embodiments, the amount of schoenite in the hydrated low sodium salt composition is between about 30 to about 60% by weight of the total composition. In certain embodiments, the amount of schoenite in the hydrated low sodium salt composition is between about 60 to about 90% by weight of the total composition. In certain embodiments, the amount of schoenite in the hydrated low sodium salt composition is about 70, 73, 75, 78, 80, 83, 85, 88 or 90% by weight of the total composition. In certain embodiments, the amount of schoenite in the hydrated low sodium salt composition is about 80, 81, 82, 83, 84 or 85% by weight of the total composition. In one embodiment, the amount of schoenite in the hydrated low sodium salt composition is about 83% by weight of the total composition.

In certain embodiments, the moisture content in the hydrated low sodium salt is between about 0.25 to about 3% by weight of the salt. In certain embodiments, the moisture content is about 0.5, 1, 1.5, 2, 2.5 or 3% of the total weight.

In other embodiments, the compositions provided herein are anhydrous low sodium salt compositions that contain sodium chloride and anhydrous double salt glaserite, $3K_2SO_4.Na_2SO_4$. The components are blended in the composition. In certain embodiments, the compositions do not contain any $MgSO_4$. In one aspect, the amount of sodium chloride in the anhydrous low sodium salt compositions is between about 15 to about 80% by weight of the total composition. In one aspect, the amount of sodium chloride in the anhydrous low sodium salt compositions is about 15, 25, 30, 35, 40, 45, 50, 55, 60, 65, 70, 75 or 80% by weight of the total composition. In one aspect, the amount of sodium chloride in the anhydrous low sodium salt compositions is about 30, 35, 40, 45, 50, 55 or 60% by weight of the total composition. In one aspect, the amount of sodium chloride in the anhydrous low sodium salt compositions is about 40, 45 or 50% by weight of the total composition.

In one aspect, the amount of anhydrous double salt glaserite in the low sodium salt compositions is between about 20 to about 85% by weight of the total composition. In one aspect, the amount of anhydrous double salt glaserite in the low sodium salt compositions is about 20, 25, 30, 35, 40, 45, 50, 55, 60, 65, 70, 75, 80 or 85% by weight of the total composition. In one aspect, the amount of anhydrous double salt glaserite in the low sodium salt compositions is about 40, 45, 50, 55, 60, 70, 80 or 85% by weight of the total composition. In one aspect, the amount of anhydrous double salt glaserite in the low sodium salt compositions is about 70, 80 or 85% by weight of the total composition.

The anhydrous low sodium salt contains less that 0.5% moisture. In one embodiment, the anhydrous low sodium salt contains less that 0.40, 0.35, 0.30, 0.25, 0.20, 0.15 or 0.10% moisture.

In certain embodiments, the composition provided herein is a blend of NaCl, $K_2SO_4$ and $Na_2SO_4$ salt. In other embodiments, the composition provided herein is a blend of NaCl, $MgSO_4$ and $K_2SO_4$. In one embodiment, the amount of sodium chloride in such compositions is between about 20 to about 80% by weight of the total composition. In one embodiment, the amount of sodium chloride in such compositions is between about 20 to about 60% by weight of the total composition. In certain embodiments, the amount of sodium chloride in such compositions is about 20, 30, 35, 40, 45, 50, 55 or 60% by weight of the total composition. In one embodiment, the amount of sodium chloride in such compositions is about 40, 45, 50, 55 or 60% by weight of the total composition.

In one embodiment, the amount of $Na_2SO_4$ in such compositions is between about 0 to about 20% by weight of the total composition. In one embodiment, the amount of $Na_2SO_4$ in such compositions is between about 5 to about 20% by weight of the total composition. In certain embodiments, the amount of $Na_2SO_4$ in such compositions is about 5, 7, 9, 11, 12, 14, 16, 18 or 20% by weight of the total composition. In one embodiment, the amount of $Na_2SO_4$ in such compositions is about 10, 11 or 12% by weight of the total composition.

In one embodiment, the amount of $K_2SO_4$ in such compositions is between about 20 to about 60% by weight of the total composition. In certain embodiments, the amount of $K_2SO_4$ in such compositions is about 20, 25, 30, 35, 40, 45, 50, 55 or 60% by weight of the total composition. In one embodiment, the amount of $K_2SO_4$ in such compositions is about 35, 37, 40, 43, 45, 47 or 50% by weight of the total composition. In one embodiment, the amount of $K_2SO_4$ in such compositions is about 40, 43, 45 or 50% by weight of the total composition.

In one embodiment, the amount of $MgSO_4$ in such compositions is between about 0 to about 20% by weight of the total composition. In one embodiment, the amount of $MgSO_4$ in such compositions is between about 5 to about 20% by weight of the total composition. In certain embodiments, the amount of $MgSO_4$ in such compositions is about 5, 7, 9, 11, 12, 14, 16, 18 or 20% by weight of the total composition. In one embodiment, the amount of $MgSO_4$ in such compositions is about 10, 11 or 12% by weight of the total composition.

In one embodiment the low sodium salt composition provided herein contains a blend of sodium chloride, a double salt $MgSO_4.K_2SO_4.6H_2O$ and KCl. In one embodiment, the amount of sodium chloride is about 20-50%. In another embodiment, the amount of sodium chloride is about 30%. In one embodiment, the amount of $MgSO_4.K_2SO_4.6H_2O$ is about 20-50%. In another embodiment, the amount of $MgSO_4.K_2SO_4.6H_2O$ is about 30%. In one embodiment, the amount of potassium chloride is about 20-50%. In another embodiment, the amount of potassium chloride is about 30%. In one embodiment, the low sodium salt composition contains equal amounts of sodium chloride, $MgSO_4.K_2SO_4.6H_2O$ and potassium chloride. In one embodiment, the amount of sodium chloride is about 33%, $MgSO_4.K_2SO_4.6H_2O$ is about 33% and potassium chloride is about 33%.

In other embodiments, the compositions provided herein are anhydrous low sodium salt compositions that contain sodium chloride and anhydrous double salt langbeinite, $2MgSO_4.K_2SO_4$. The components are blended in the composition. In certain embodiments, the compositions can further contain small quantities of KCl and/or $MgSO_4.H_2O$. In one aspect, the amount of sodium chloride in the anhydrous low sodium salt compositions is between about 15 to about 80% by weight of the total composition. In one aspect, the amount of sodium chloride in the anhydrous low sodium salt compositions is about 15, 25, 30, 35, 40, 45, 48, 50, 55, 60, 65, 70, 75 or 80% by weight of the total composition. In one aspect, the amount of sodium chloride in the anhydrous low sodium salt compositions is about 30, 35, 40, 45, 48, 50, 55 or 60% by weight of the total composition. In one aspect, the amount of sodium chloride in the anhydrous low sodium salt compositions is about 40, 45, 48 or 50% by weight of the total composition.

In one aspect, the amount of anhydrous double salt langbeinite in the low sodium salt compositions is between about 20 to about 70% by weight of the total composition. In one aspect, the amount of anhydrous double salt langbeinite in the low sodium salt compositions is about 20, 25, 30, 35, 40, 45, 48, 50, 55, 60, 65 or 70% by weight of the total composition. In one aspect, the amount of anhydrous double salt langbeinite in the low sodium salt compositions is about 40, 45, 48, 50, 55, 60 or 70% by weight of the total composition. In one aspect, the amount of anhydrous double salt langbeinite in the low sodium salt compositions is about 40, 45, 48 or 50% by weight of the total composition.

The anhydrous low sodium salt contains less that about 0.5% moisture. In one embodiment, the anhydrous low sodium salt contains less that about 0.40, 0.35, 0.30, 0.25, 0.20, 0.15 or 0.10% moisture.

In certain embodiments, the anhydrous low sodium salt further contains KCl in less that about 5% or 4% by weight of the total composition. In certain embodiments, the anhydrous low sodium salt further contains KCl in about 0.5 to about 5% by weight of the total composition. In certain embodiments, the anhydrous low sodium salt further contains KCl in about 1 to about 3% by weight of the total composition. In certain embodiments, the anhydrous low sodium salt further contains KCl in about 1, 1.5, 2, 2.5, 2.8, 3, 3.5 or 4% by weight of the total composition.

In certain embodiments, the anhydrous low sodium salt composition further contains an anti-caking agent. The anti-caking agents are added to provide a free-flowing product. Exemplary anti-caking agents include, but are not limited to sodium hexacyanoferrate (II) (YPS), potassium hexacyanoferrate (II) trihydrate (also known as potassium ferrocyanide or YPP), tricalcium phosphate and magnesium carbonate. In another embodiment, anti-caking agents include silicates, propylene glycol and polyvinyl alcohol. In one embodiment, the anti-caking agent is YPS. The anti-caking agent can be added in an amount sufficient to prevent formation of lumps or to keep the composition in free flowing form. In certain embodiments, the amount of anti-caking agent YPS added to the composition is less that about 20 ppm by weight. In certain embodiments, the amount of anti-caking agent YPS added to the composition is less that about 20, 18 or 15 ppm by weight.

In certain embodiments, the low sodium salt compositions provided herein optionally contain other ingredients typically present in table salt and salt substitute products. Other suitable ingredients include iodide sources, flavors and flavor enhancers. An exemplary iodide source is KI, in certain embodiments, with dextrose as a stabilizer. In one embodiment, flavor enhancers include monosodium glutamate (MSG), meat extracts, protein hydrolysates, hydrolyzed vegetable protein (hvp), autolyzed yeast, and mononucleotide salts such as 5'-inosine monophosphate and 5'-guanidine monophosphate.

6.3 Methods of Preparation

The compositions provided herein can be prepared from sea water, lake water, brackish or underground water, sea water bittern or lake bitterns or by blending of the various salt components. In one aspect, the methods of preparation involve evaporation of natural waters, including sea water, lake water, brackish or underground water, sea water bittern or lake bitterns, to obtain a mixed salt containing kainite ($K_2SO_4.MgSO_4.MgCl_2.6H_2O$) and sodium chloride. This mixed salt is used as the starting feed block for the hydrous and anhydrous low sodium salt compositions. In certain embodiments, kainite starts precipitating when the bitterns reach magnesium concentration of about 6% by weight. In certain embodiments, kainite precipitates when the magnesium concentration of the bitterns is between about 6% to about 8% by weight. In certain embodiments, kainite precipitates when the magnesium concentration of the bitterns is about 6%, 7% or 8% by weight.

Kainite and sodium chloride mixed salt is dissolved in sea water or salt lake water and the resulting solution is allowed to stand till insoluble impurities settle and a clear solution is obtained. In certain embodiments, the magnesium concentration in the clear solution is about 2-4% by weight. In certain embodiments, the magnesium concentration in the clear solution is about 2, 3 or 4% by weight. In one embodiment, the magnesium concentration in the clear solution is about 3% by weight.

The clear solution is further evaporated to precipitate schoenite, $MgSO_4.K_2SO_4.6H_2O$ and sodium chloride mixed salt. In certain embodiments, schoenite and sodium chloride mixed salt precipitates when concentration of magnesium in the solution is between about 3-5% by weight. In certain embodiments, schoenite and sodium chloride mixed salt precipitates when concentration of magnesium in the solution is about 3, 4 or 5% by weight. The schoenite precipitate is harvested and milled to obtain the desired crystal size. The milled schoenite is subjected to counter current washing to remove the $MgCl_2$ entrapped solution. The hydrous low sodium salt recovered at the end of the washing step is ready to be used in the food products.

In one aspect, the hydrated low sodium salt is further washed and centrifuged to remove solution. The centrifuged cake is sprayed with a solution of anti-caking agent, such as YPS.

In one embodiment, provided herein is a process for preparing an anhydrous low sodium salt composition containing a blend of $3K_2SO_4.Na_2SO_4$ and sodium chloride by reacting predominantly $MgSO_4.K_2SO_4.6H_2O$ with potassium chloride in sea water or salt lake water and filtering the low sodium salt composition. The mixture is then dried to obtain free flowing anhydrous low sodium salt composition containing predominantly glaserite and sodium chloride. The mixture can be dried with hot air or flue gases. In one embodiment, the mixture is dried at up to 300° C. or more. In certain embodiments, the mixture is dried with at about 100° C., 110° C., 120° C., 130° C., 135° C., 140° C., 150° C., 170° C., 190° C., 200° C. or 250° C. In one embodiment, the mixture is dried with hot air or flue gases at about 135° C. In certain embodiments, the anhydrous low sodium salt obtained by this process is further mixed with table salt to obtain the desired ratio of sodium chloride in the composition.

In certain embodiments, the hydrated low sodium salt composition is dried using a fluid bed dryer, including vibrating fluid bed dryer at temperatures ranging from about 110-150° C.

In certain embodiment, the shoenite is subjected to a two step counter current reaction process with potassium chloride and sea water to obtain glaserite and sodium chloride solution. This mixture is then washed and centrifuged to separate solids and solution. The centrifuged cake is mixed with anti-caking agent, such as YPS solution and dried. In certain embodiments, the anhydrous low sodium salt obtained by this process is further mixed with table salt to obtain the desired ratio of sodium chloride in the composition.

In certain embodiments, the anhydrous low sodium salt composition provided herein is obtained by blending $K_2SO_4$, $Na_2SO_4$ and NaCl in a blend.

In certain embodiments, the anhydrous low sodium salt composition provided herein is obtained by reacting $K_2SO_4$ and $Na_2SO_4$ to provide glaserite and blended with NaCl in a blend.

In one embodiment, provided herein is a process for preparing a low sodium salt composition containing predominantly $MgSO_4.K_2SO_4.6H_2O$ by mixing kainite and water to obtain a slurry, agitating the slurry to obtain a precipitate, and filtering the precipitate to obtain the low sodium salt composition. In some embodiments, the agitating is continued for about 1-2 or about 1 hour.

In one embodiment, provided herein is a process for preparing a low sodium salt composition containing predominantly $3K_2SO_4.Na_2SO_4$ by reacting $MgSO_4.K_2SO_4.6H_2O$ with potassium chloride and water to obtain a slurry, agitating the slurry to obtain a precipitate, and filtering and drying the precipitate to obtain the low sodium salt composition. In some embodiments, the agitating is continued for about 2 hours.

In some embodiments, the process provided herein is for preparing a low sodium salt composition containing $3K_2SO_4.Na_2SO_4$ by reacting potassium sulfate, sodium sulfate, sodium chloride in water to obtain a slurry, agitating the slurry, and filtering the slurry to obtain the low sodium salt composition. In some embodiments, the agitating is continued for about 1-2 or about 1 hour.

In one embodiment, provided herein is a process for preparing a low sodium salt composition containing $3K_2SO_4.Na_2SO_4$, wherein the process involves dissolving $MgSO_4.K_2SO_4.6H_2O$ in water, including water from any natural source, such as ocean, sea, brackish, lakes, such as salt lake or regular underground water, to obtain a solution, cooling the solution to about 5-10° C. to obtain a precipitate of $Na_2SO_4.10H_2O$ (also known as Glauber Salt), filtering the precipitate to obtain a filtrate and evaporating the filtrate to obtain a low sodium salt composition. In one embodiment, the evaporation is continued till the Mg concentration reaches around 3% by weight. In one embodiment, the low sodium salt composition obtained in the process contains about 60-90% $3K_2SO_4.Na_2SO_4$ and about 40-10% NaCl.

6.4 Methods of Use

The hydrated and anhydrous low sodium salt provided herein can be used as a salt substitute in food products or as a table salt in the salt shaker for tabletop use for sprinkling on prepared foods. Additionally, the low sodium salt compositions provided herein can be used in commercial food manufacturing processes, for example, to salt the processed foods. Representative foods include soups, vegetables, meat, poultry, fish, cheese, breads, snack foods, such as potato chips, pretzels, peanuts, seeds, corn chips, tortilla chips, crackers and bread sticks. The low sodium salt compositions are applied to the foods in amounts sufficient to provide the saltiness desired. In a further embodiment, a food product containing a low sodium salt is provided herein. The food product containing the low sodium salt can further contain dietary supplements or flavoring agents.

7. EXAMPLES

7.1 Example 1

Production of Low Sodium Salt Composition from Sea Water

Kainite Production

Sea water was pumped from the sea into open earth ponds where the water was subjected to solar evaporation. The sea water in the ponds contained water and salts in the following amounts:

|  | Wt % |
|---|---|
| Ca | 0.05 |
| Mg | 0.15 |
| K | 0.05 |
| Na | 1.26 |
| $SO_4$ | 0.32 |
| Cl | 2.28 |
| $H_2O$ | 95.88 |

The solar evaporation of sea water was conducted in two stages. The first stage was the concentration stage in which the evaporation was continued till water reached saturation, at which point sodium chloride started to crystallize and precipitate. The second stage was crystallization stage in which sodium chloride precipitated. At this stage the evaporation was continued till magnesium concentration reached 3%. The sea water bitterns with 3% magnesium were transferred to a another solar evaporation pond and evaporation was continued. The precipitate obtained at this stage was low quality sodium chloride, suitable for use in, for example, deicing roads in winter. The evaporation was continued till magnesium concentration in the bitterns reached 5% at which point the bitterns were transferred to another solar evaporation pond. At this stage, magnesium sulfate mixed with sodium chloride precipitated (in about 50/50 ratio).

The remaining bitterns with 6% magnesium were transferred to the next solar evaporation pond to continue further evaporation. At this stage, kainite ($MgSO_4.KCl.3H_2O$) and sodium chloride mixture started to precipitate. The precipitation was allowed to continue till the magnesium concentration in the bitterns reached 8%.

The kainite-sodium chloride mixture obtained served as a starting feed block for the hydrous and anhydrous low sodium sea salt. The mixture had the following composition (amounts in weight %):

| | |
|---|---|
| Insoluble | 1.00 |
| Mg | 7.72 |
| K | 11.65 |
| Na | 8.10 |
| $SO_4$ | 29.13 |
| Cl | 22.46 |
| $H_2O$ | 19.94 |

The kainite precipitate was in the form of a bed of crystals. The pond was filled with sea water to dissolve kainite. The sea water had the following composition:

| | |
|---|---|
| Ca | 0.05 |
| Mg | 0.15 |
| K | 0.05 |
| Na | 1.26 |
| $SO_4$ | 0.32 |
| Cl | 2.28 |
| $H_2O$ | 95.88 |

The dissolution of the kainite-NaCl mixture continued for several weeks till the following composition was reached (amounts in weight %):

| | |
|---|---|
| Mg | 2.76 |
| K | 2.78 |
| Na | 4.63 |
| $SO_4$ | 7.86 |
| Cl | 11.97 |
| $H_2O$ | 70.00 |
| Insoluble | 0.77 |

The kainite-sodium chloride solution was transferred to a holding pond to settle the insoluble impurities. The clear kainite solution (containing about 3% magnesium) was transferred to the next evaporation pond. The clear solution had the following composition (amounts in weight %):

| | |
|---|---|
| Mg | 3.03 |
| K | 3.05 |
| Na | 5.07 |
| $SO_4$ | 8.62 |
| Cl | 13.13 |
| $H_2O$ | 67.09 |

Further solar evaporation of the clear solution yielded precipitate of schoenite ($MgSO_4.K_2SO_4.6H_2O$) and sodium chloride. The evaporation process was continued in this pond till the magnesium ion concentration reached 5% by weight.

Schoenite Harvesting

The hard crystal bed of schoenite was broken by a cutting machine. Any other suitable cutting machine known to one of skill in the art could be used for this purpose. The schoenite crystals were broken to the desired size and stock piled with the use of regular heavy equipment, such as motor graders and so forth.

Schoenite Milling and Washing

The harvested schoenite was trucked and fed to the milling plant where the schoenite was milled to insure homogenous crystal size of the product. The milled schoenite was washed in a counter current wash leg to remove mother liquor. The washed schoenite was subjected to a centrifugation step to remove liquids. The wet centrifuge cake was dried at low temperature to obtain the hydrated low sodium salt. The hydrated low sodium salt had the following composition:

| | |
|---|---|
| Mg | 2.97 |
| K | 9.53 |
| Na | 21.84 |
| $SO_4$ | 23.47 |
| Cl | 33.66 |
| $H_2O$ | 8.53 |

The schoenite-NaCl mixture thus obtained contained 21.78% sodium as compared to 39.32% in regular salt. The hydrated low sodium salt prepared by this process contained 44.6% lower sodium than regular salt.

The hydrated low sodium salt was subjected to further processing steps as follows to obtain anhydrous low sodium salt composition.

Addition of Anti-Caking Agent

Anti-caking agent YPS was added in solution form to the centrifuge cake. The amount of YPS used was less than 20 ppm by weight.

Drying the Schoenite

The hydrous schoenite was dried after the addition of YPS solution to remove moisture from the mixture. In the process of drying, part or all of the six moles of $H_2O$ constituting the schoenite salt may be driven off to obtain the low moisture schoenite.

Addition of NaCl.

Depending on the quality of the final product desired, sodium chloride was added to schoenite to obtain the low moisture low sodium salt composition containing predominantly schoenite and sodium chloride.

7.2 Example 2

Preparation of Hydrated Low Sodium Salt, by Converting or Processing Kainite to Schoenite One kg of kainite obtained from sea water (as described in example 1) was subjected to further processing in a laboratory scale to obtain schoenite. One kilogram of kainite with the following composition (weight percent) was used as a starting material:

| | |
|---|---|
| Insoluble | 1.00 |
| Mg | 7.72 |
| K | 11.65 |
| Na | 8.10 |

-continued

| | |
|---|---|
| SO$_4$ | 29.13 |
| H$_2$O | 19.94 |

The kainite was placed in a two liter beaker with 337 grams of water. The mixture was agitated with an electrical agitator for one hour at ambient temperature to obtain a slurry. The slurry was filtered to provide a filter cake of hydrated low sodium salt containing schoenite (520 grams, 83%) and NaCl (110 grams, 17%) mixture (total yield: 630 gram).

The hydrated low sodium salt obtained had the following composition.

| | |
|---|---|
| Mg | 5.14 |
| K | 14.67 |
| Na | 4.17 |
| SO$_4$ | 40.55 |
| Cl | 10.21 |
| H$_2$O | 25.26 |

7.3 Example 3

Production of Glaserite from Schoenite

To a two liter beaker with 1.08 kg of water at ambient temperature were introduced one kg of schoenite of the following composition in wt %:

| | |
|---|---|
| Mg | 4.72 |
| K | 11.4 |
| Na | 11.5 |
| SO$_4$ | 32.41 |
| Cl | 17.73 |
| H$_2$O | 22.4 |

169 grams potassium chloride and 394 grams of sodium chloride were added to the slurry of schoenite and water. The slurry was agitated with an agitator for two hours at ambient temperature. A precipitate containing glaserite and NaCl mixture (737 grams) was filtered and dried. The dried low sodium salt had the following composition:

| | |
|---|---|
| K | 17.62 |
| Na | 23.12 |
| SO$_4$ | 28.91 |
| Cl | 30.34 |

The filtrate (1.9 kg) had the following composition (in weight %):

| | |
|---|---|
| Mg | 2.48 |
| K | 3.81 |
| Na | 5.22 |
| SO$_4$ | 5.83 |
| Cl | 14.35 |
| H$_2$O | 68.30 |

The low sodium salt containing glaserite and NaCl mixture had of 23.12% sodium as compared to 39.32% in regular salt, i.e., about 41% lower sodium than regular salt.

7.4 Example 4

Production of Glaserite

One kg potassium sulfate, 272 grams of sodium sulfate and 700 grams of sodium chloride were added to a beaker containing 1 liter water at ambient temperature. The mixture was agitated to obtain a slurry with a following composition, (by weight percent):

| | |
|---|---|
| K | 5.84 |
| Na | 8.33 |
| SO$_4$ | 1.61 |
| Cl | 16.97 |
| H$_2$O | 67.23 |

The slurry was agitated for one hour at ambient temperature. The slurry was filtered in a lab vacuum filter to obtain a filtered cake containing glaserite-sodium chloride mixture, $3K_2SO_4.Na_2SO_4+NaCl$, having the same composition as the slurry above.

7.5 Example 5

Blending Solid K$_2$SO$_4$, Na$_2$SO$_4$ and NaCl to Obtain Anhydrous Low Sodium Salt Composition One kg of potassium sulfate, 272 grams of sodium sulfate and 700 grams of sodium chloride were added to a blender. Fifteen minute of blending was allowed, in order to minimize undersize fines. The anhydrous low sodium salt composition obtained had the same taste and saltiness as the anhydrous low sodium salt composition produced in example 1.

7.6 Example 6

Preparation of Low Sodium Salt Containing Langbeinite from Schoenite

To a beaker of three liters, two liters saturated solution of the following composition in Wt % was introduced. The solution was heated to 90 degrees Celsius:

| % w/w | Mg | K | Na | SO$_4$ | Cl | H$_2$O | Total |
|---|---|---|---|---|---|---|---|
| H$_2$O | | | | | | 31.21 | 31.21 |
| Sylvite (KCl) | | 4.00 | | | 3.64 | | 7.64 |
| Halite (NaCl) | | | 1.72 | | 2.65 | | 4.37 |
| Epsomite (MgSO$_4$•7H$_2$O) | 0.41 | | | 1.63 | | 2.14 | 4.18 |
| Bischofite (MgCl$_2$•6H$_2$O) | 6.29 | | | | 18.38 | 27.95 | 52.62 |
| Total | 6.70 | 4.0 | 1.72 | 1.63 | 24.67 | 61.30 | 100.02 |

The beaker was placed on a hot plate to maintain the temperature and carefully covered to keep the solution from evaporation.

1 kg of schoenite-NaCl mixture (about 48% each of schoenite and sodium chloride and about 5% epsomite) was fed to the beaker and the mixture was agitated for three hours. The slurry obtained was centrifuged to obtain the low sodium salt product containing landbenite. Analysis of the product showed Langbeinite-Halite-Sylvite mixture of the following composition in Wt %:

| | |
|---|---|
| Langbeinite (2MgSO$_4$•K$_2$SO$_4$) | 48.85 |
| Sylvite (KCl) | 2.88 |
| Halite (NaCl) | 48.27 |

7.7 Example 7

Preparation of Low Sodium Salt Containing Langbeinite from Kainite

To a beaker of three liters, two liters saturated solution of the following composition in Wt % were introduced. The solution was heated to 90 degrees Celsius.

| % w/w | Mg | K | Na | SO$_4$ | Cl | H$_2$O | Total |
|---|---|---|---|---|---|---|---|
| H$_2$O | | | | | | 31.21 | 31.21 |
| Sylvite (KCl) | | 4.00 | | | 3.64 | | 7.64 |
| Halite (NaCl) | | | 1.72 | | 2.65 | | 4.37 |
| Epsomite (MgSO$_4$•7H$_2$O) | 0.41 | | | 1.63 | | 2.14 | 4.18 |
| Bischofite (MgCl$_2$•6H$_2$O) | 6.29 | | | | 18.38 | 27.95 | 52.62 |
| Total | 6.70 | 4.0 | 1.72 | 1.63 | 24.67 | 61.30 | 100.02 |

The beaker was placed on a hot plate to maintain the temperature and carefully covered to keep the solution from evaporation.

1 kg of kainite-NaCl mixture (about 55% kainite, 35% sodium chloride and about 10% epsomite) was fed to the beaker and the mixture was agitated for three hours. The slurry obtained was centrifuged to obtain the low sodium salt product containing landbenite. Analysis of the product showed Langbeinite-Halite-Sylvite mixture of the following composition in Wt %:

| | |
|---|---|
| Langbeinite (2MgSO$_4$•K$_2$SO$_4$) | 45.85 |
| Sylvite (KCl) | 5.65 |
| Halite (NaCl) | 48.80 |

The low sodium salt compositions provided herein can be substituted for regular salt in prepared foods or for external use as table salt, including for use in salt shakers. The low sodium salt provided herein is useful in reducing the sodium intake.

All publications, patents and patent applications cited in this specification are herein incorporated by reference as if each individual publication or patent application were specifically and individually indicated to be incorporated by reference. Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A low sodium salt composition comprising a blend of sodium chloride and a double salt 2MgSO$_4$.K$_2$SO$_4$, wherein 2MgSO$_4$.K$_2$SO$_4$ is present in an amount of about 20-70% by the total weight of the composition.

2. The low sodium salt composition of claim 1, wherein the composition contains about 20-80% lower sodium than regular salt.

3. The low sodium salt composition of claim 1, wherein the composition contains about 25%, 30%, 35%, 45%, 50%, 55% or 60% lower sodium than regular salt.

4. The low sodium salt composition of claim 1, wherein the composition contains about 5-35% sodium by the total weight of the composition.

5. The low sodium salt composition of claim 1, wherein the composition contains about 10-80% sodium chloride by the total weight of the composition.

6. The composition of claim 1, wherein the composition contains about 40, 45, 48 or 50% 2MgSO$_4$.K$_2$SO$_4$ by the total weight of the composition.

7. The composition of claim 1, wherein the composition further comprises less than 5% potassium chloride.

8. The composition of claim 1 comprising from about 40 to about 50% sodium chloride and from about 40 to about 50% 2MgSO$_4$.K$_2$SO$_4$ by the total weight of the composition.

9. A process for preparing the low sodium salt composition of claim 1 comprising:
   i) reacting MgSO$_4$.7H$_2$O, MgCl$_2$.6H$_2$O, schoenite, sodium chloride and magnesium chloride in water at a temperature greater than 75° C.,
   ii) agitating the slurry to obtain a precipitate, and
   iii) filtering the precipitate to obtain the low sodium salt composition.

10. A process for preparing the low sodium salt composition of claim 1 comprising:
    i) reacting MgSO$_4$.7H$_2$O, MgCl$_2$.6H$_2$O, kainite, sodium chloride and magnesium chloride in water at a temperature greater than 75° C.,
    ii) agitating the slurry to obtain a precipitate, and
    iii) filtering the precipitate to obtain the low sodium salt composition.

11. A food product comprising the low sodium salt composition of any of claims 1.

12. The food product of claim 11, further comprising a dietary supplement.

13. The food product of claim 12, wherein the dietary supplement is a vitamin.

14. The food product of claim 11, further comprising a flavoring agent.

* * * * *

UNITED STATES PATENT AND TRADEMARK OFFICE
CERTIFICATE OF CORRECTION

PATENT NO. : 7,820,225 B2  Page 1 of 1
APPLICATION NO. : 12/073541
DATED : October 26, 2010
INVENTOR(S) : Juan Antonio Flores Zuniga It is certified that error appears in the above-identified patent and that said Letters Patent is hereby corrected as shown below:

Title Page, please <u>insert</u> entry (63) for Related U.S. Application Data between entries (65) and (51) as follows:

-- Related U.S. Application Data

(63) Continuation in part of application No. 11/715,706 filed March 7, 2007, now Patent No. 7,854,956. --

Signed and Sealed this
Twenty-ninth Day of March, 2011

David J. Kappos
*Director of the United States Patent and Trademark Office*